Nov. 3, 1925.
M. J. TRUMBLE
RELIEF VALVE
Filed Nov. 21, 1922
1,559,812
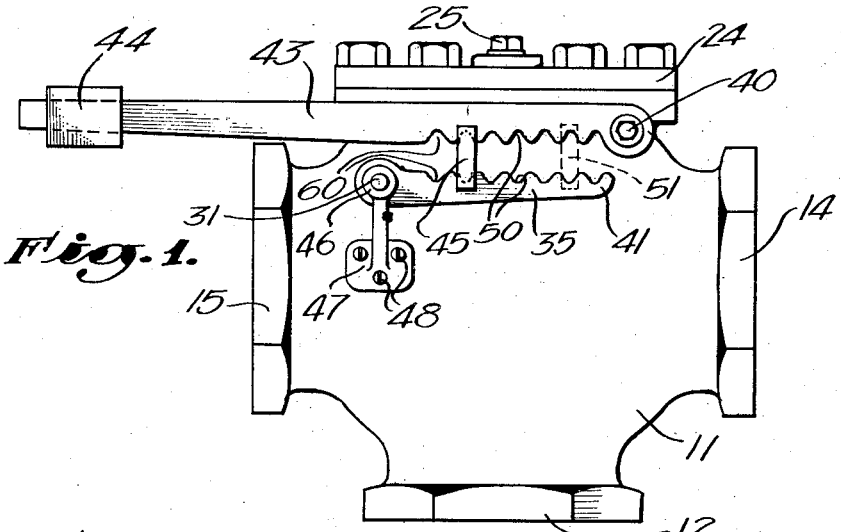
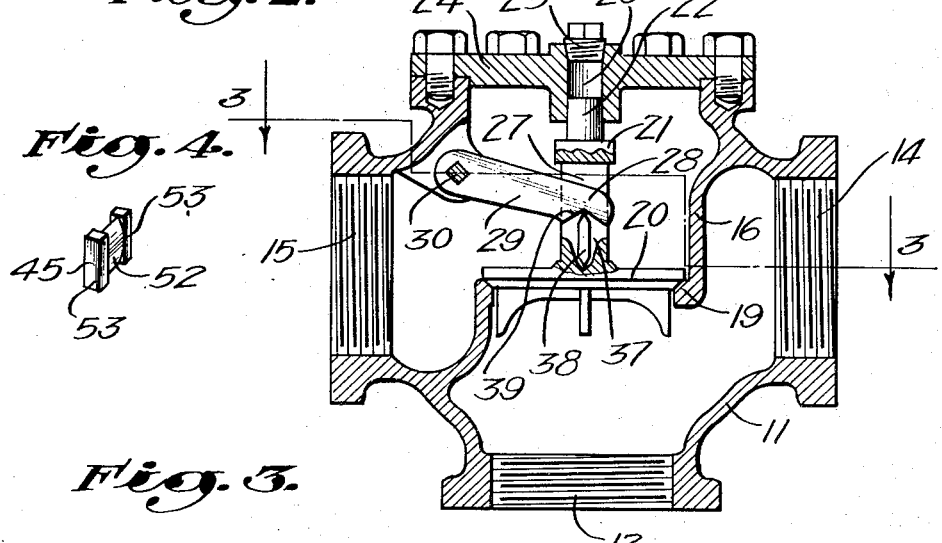
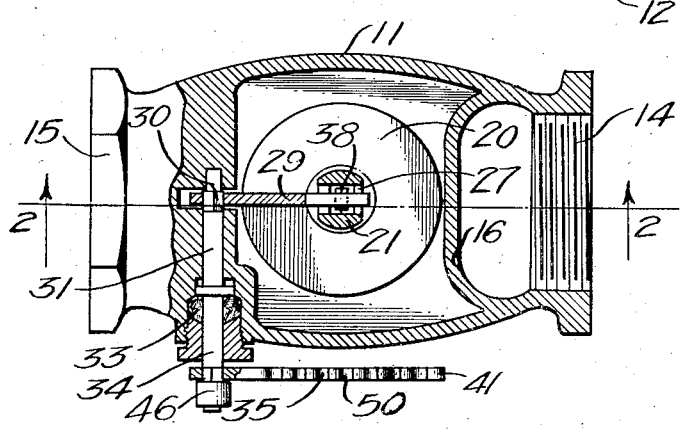
INVENTOR:
MILON J. TRUMBLE,
BY
Graham Harris
ATTORNEYS.

Patented Nov. 3, 1925.

1,559,812

UNITED STATES PATENT OFFICE.

MILON J. TRUMBLE, OF ALHAMBRA, CALIFORNIA, ASSIGNOR TO BROWN VALVE AND MANUFACTURING CO., OF ALHAMBRA, CALIFORNIA, A CORPORATION.

RELIEF VALVE.

Application filed November 21, 1922. Serial No. 602,350.

*To all whom it may concern:*

Be it known that I, MILON J. TRUMBLE, a citizen of the United States, residing at Alhambra, in the county of Los Angeles and State of California, have invented a new and useful Relief Valve, of which the following is a specification.

This invention relates to a relief valve which is employed in a high pressure system which opens under pressure at a designated point and thus prevents an increase of the pressure in the system above this point.

It is an object of the invention to provide a relief valve in which a broad range of variations in pressure may be attained with a weight beam of comparatively short length and a weight of small mass.

It is a further object of the invention to provide a relief valve of this character having a very large gas outlet which can be made to resist high pressures with the employment of a comparatively small weight.

The particular advantages of the invention and further objects thereof will be made evident hereinafter.

Referring to the drawing which is for illustrative purposes only.

Fig. 1 is an elevational view of a relief valve embodying the principles of the invention.

Fig. 2 is a vertical longitudinal section through the valve shown in Fig. 1, this section being taken on a plane represented by the line 2—2 of Fig. 3.

Fig. 3 is a horizontal section taken as indicated by the line 3—3 of Fig. 2.

Fig. 4 is a perspective view of the adjustable link employed to transfer the operating force from the secondary length to the primary length of the valve.

As shown in the drawing the invention provides a globular valve body or casing 11 having an inlet 12, a direct outlet 14, and a relief outlet 15. A wall 16 is formed across the interior of the body 11 dividing the inlet 12 and the direct outlet 14 from the relief outlet 15. In this wall 16 is a valve opening 19 of substantially the same diameter as the pipe which the inlet and outlet openings will accommodate, and in this valve opening 19 a closure plate or valve 20 is seated, this closure plate having a centrally extending stem 21 which has a pin 22 formed at the upper end thereof, which stem is guided in a recess 23 formed in the cover plate 24, there being provided a plug 25 for closing the upper extremity of the recess 23.

Through a slot 27 formed in the stem 21 there extends the forward end 28 of a lever 29 which is mounted upon the squared end 30 of a turnable shaft 31 which projects outwardly through a stuffing box 33 and has mounted upon the outer end 34 thereof a primary operating arm 35. The extreme outer end of the shaft 31 is supported in an outboard bearing 46 which is supported by a bracket 47 attached to the body 11 by screws 48, as shown in Figs. 1 and 3. The primary operating arm 35 extends in a substantially horizontal direction as shown in Fig. 1 of the drawing. In a seat 37 formed in the bottom of the slot 27 a chisel pointed knife blade 38 is situated, the upper end of which blade 38 is received in a notch 39 formed adjacent to the end 28 of the lever 29. Pivoted upon a screw 40 situated beyond and above the swinging end 41 of the primary arm 35 is a secondary weight arm 43 which carries a slidable weight 44. The downward force exerted by the weight 44 is transferred from the secondary arm 43 through a link 45 to the primary arm 35 and is from thence applied through the shaft 31, the lever 29 and the knife blade 38 to the closure plate 20.

It will be perceived that with the link 45 in the position shown, the force applied to resist the raising of the closure plate 20 may be varied by moving the weight 44 upon the secondary arm 43. A further variation of the force applied to the closure plate may be attained by moving the link 45 into the various sets of serrations 50 formed in the adjacent edges of the arms 35 and 43, one of these positions being indicated by the dotted lines 51 in Fig. 1. As the link member 45 consists merely of an oval web 52 having flanges 53 formed upon each end thereof, its position between the arms 35 and 43 may be changed by simply lifting the arm 43 and moving the member 45 into another serration 50 in the primary arm 35 and holding it in a vertical position so that as the arm 43 is lowered, the upper edge of the web 52 will be engaged in the serration 50 of the arm 43 opposite to the serration in the arm 35 in which the lower edge of the web 52 is situated.

It will be perceived that the static force applied to the outer end of the arm 43 by the weight 44, is multiplied in its transfer to the arm 35, due to the leverage of the arm 43. It will further be perceived that the leverage of the force transferred through the member 45 upon the shaft 34 depends upon the distance the member 45 is spaced from the point of pivot of the arm, which point of pivot is the axis of the shaft 31. By moving the member 45 one notch to the right between the arms 35 and 43 the leverage effect of the arm 35 is increased, due to the moving of the point of application of force away from the point of pivot, and the multiplication of the force applied by the weight 44 is increased due to the shortening of the distance between the link member 45 and the pin 40 which serves as a fulcrum for the arm 43; a compound increase in the application of force applied to the arm 29 of the closure plate 20 is thus attained.

By suitably proportioning the parts and locating the link member 45 in the slots indicated at 60, upon moving the weight 44 inwardly upon the arm 43, the force applied to the closure plate 20 may be made so small that the relief valve will open under a few ounces of pressure, whereas, if the member 45 is moved into the position indicated by the dotted lines 55 and the weight 44 located in the position shown in the drawing, a resistance of several hundred pounds against opening may be given to the closure plate 20.

The openings 12 and 14 although designated as inlet and outlet may be employed interchangeably for this purpose with equal results, the relief pipe being under all conditions screwed into the opening 15.

The principal advantages of my invention are that it has a very large valve opening which will accommodate substantially the entire capacity of the piping connected thereinto and that, as hereinbefore described, a very wide range of pressure resistance may be attained, thus adapting the valve to use for a great many purposes.

I claim as my invention:

1. In a relief valve, the combination with a casing provided with a valve opening and a valve normally closing said opening, of pressure resisting means co-acting with said valve comprising a pivoted primary arm; means connecting said primary arm to said valve; a secondary arm pivoted adjacent the free end of said primary arm; means connecting said arms, the adjacent edges of said arms serrated to receive the edges of said connecting means; and a weight carried by and slidable on said secondary arm.

2. In a relief valve, the combination with a casing provided with a valve opening and a valve normally closing said opening, of pressure resisting means co-acting with said valve comprising a pivoted primary arm; means connecting said primary arm to said valve; a secondary arm pivoted adjacent the free end of said primary arm, the adjacent edges of said arms serrated; a web adapted to extend between said adjacent serrations and provided with flanges formed on the ends thereof to prevent lateral displacement of the web relative to the arms; and a weight carried by and slidable on said secondary arm.

3. In a relief valve, the combination with a casing provided with a valve opening and a valve normally closing said opening, of pressure resisting means co-acting with said valve comprising a shaft supported in said valve casing and extending outside thereof; a lever carried by said shaft connected to said valve; a primary arm connected to said shaft on the outside of said valve casing; a secondary arm pivoted adjacent the free end of said primary arm; a weight carried by and slidable lengthwise on said secondary arm; and adjustable means for connecting said arms at any of a plurality of points between the pivots.

4. In a relief valve, the combination of a casing provided with a valve opening; a valve normally closing said opening; a cover plate for said valve casing; means carried by said valve co-acting with said cover plate for vertically guiding said valve; a shaft supported in said valve body and extending outside thereof; a lever carried by said shaft connected to said valve; a primary arm connected to said shaft on the outside of said valve casing; a secondary arm pivoted adjacent the free end of said primary arm; a weight carried by and slidable lengthwise of said secondary arm; and adjustable means for connecting said arms at any of a plurality of points between the pivots.

In testimony whereof, I have hereunto set my hand at Los Angeles, California, this 15th day of November 1922.

MILON J. TRUMBLE.